June 18, 1963 R. S. HOWELL 3,094,429
METHOD OF ELECTROSTATIC RECORDING WITH DIFFERENT INKS
Filed July 31, 1959 2 Sheets-Sheet 1

INVENTOR.
RICHARD S. HOWELL
BY
AGENT

June 18, 1963 R. S. HOWELL 3,094,429
METHOD OF ELECTROSTATIC RECORDING WITH DIFFERENT INKS
Filed July 31, 1959 2 Sheets-Sheet 2
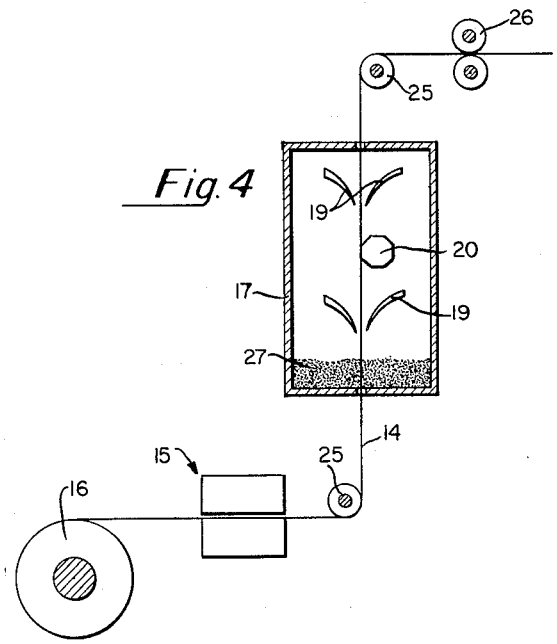
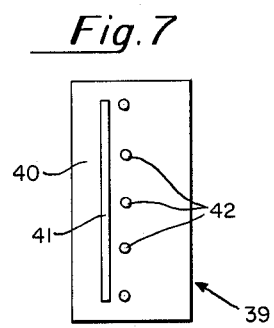
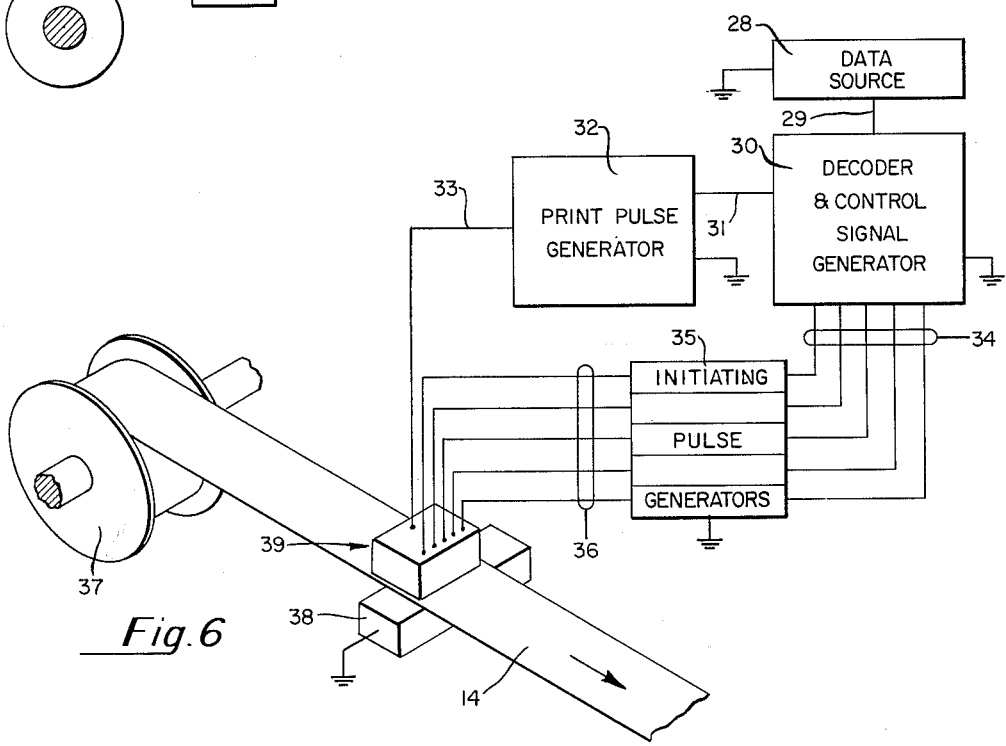
*INVENTOR.*
RICHARD S. HOWELL
BY
AGENT though not necessarily uniform, conductivity. An ink developed in accordance with the formula set forth above has been found well suited for inking electrostatic charge patterns of densities differing sufficiently to cause the medium to accept different inks in regions of different densities of charge.

3,094,429
METHOD OF ELECTROSTATIC RECORDING WITH DIFFERENT INKS

Richard S. Howell, King of Prussia, Pa., assignor to Burroughs Corporation, Detroit, Mich., a corporation of Michigan
Filed July 31, 1959, Ser. No. 830,772
9 Claims. (Cl. 117—17.5)

This invention pertains to developing pigments or inks for rendering visible electrostatic charge patterns and to the manner of their preparation and use.

In application for United States Patent Serial Number 784,300, entitled "Electrostatic Recording," filed December 31, 1958, by David W. Seymour and assigned to the assignee of this application, there is taught the use of a particulate ink of moderate density, having an electrically conductive outer surface, and contrasting in some color with that of the surface of the electrostatic recording medium used. However, the embodiments there described were limited in the range of possible colors, since the coloring means employed had to possess certain physical and electrical characteristics which were not generally found in conventional dyes.

I have found that, by modifying and improving the process taught by Seymour, I can use conventional dyes to color ink particles which have been found, by test in conventional electrostatic printing equipment, to function as completely satisfactory pigments or inks for rendering visible patterns of electric charges deposited on dielectric record media. Furthermore, by providing inks of distinctly different ranges of particle size and of different colors, I can cause the coarser ink to adhere to the region of greater charge density, thus effecting electrostatic printing or recording in different colors.

Thus one important object of my invention is to provide an ink or pigment for developing or rendering visible electrostatic charge patterns in any one of a large number of colors.

Another important object of my invention is to develop electrostatic charge patterns of varying density in colors dependent upon the density of the electrical charge developed.

Other objects and benefits of my invention will appear in the following description and specification.

For the better comprehension of my invention, I provide figures of drawing as follows:

FIGURE 4 represents the dielectric medium of FIGURE 2 undergoing development by an alternate process and apparatus according to my invention;

FIGURE 6 represents a means for applying charge patterns of varying density to a dielectric recording medium; and FIGURE 7 represents a detail of the means for applying charge patterns of varying density to a dielectric recording medium.

Figure 1:
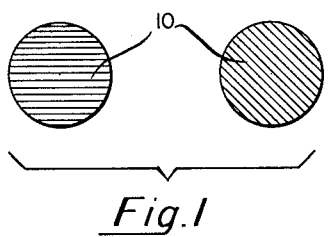
FIGURE 1 represents enlarged views of particles of clay cracking catalyst covered with colored coating, according to my invention.

As is explained in detail in the application of Seymour, previously referred to, the base material for a particulate ink should preferably have a specific gravity of the order of three or four referred to water, and be sufficiently non-friable to sustain fixing pressure. For the purposes of my invention it is desirable that the base material be either highly absorbent or porous or both, in order to produce firm adherence of the electrically conductive dye mixture to the base. While some glasses are hygroscopic, usual commercial glasses tend to be resistive to water and weak chemicals, so that the adherence of a conductive dye mixture to a good grade of glass is likely to be poor. Porous nonvitreous ceramics, on the other hand, are good absorbers of the dye mixture.

A suitable material for my improved ink is the fluid solid particles of porous clay known in the petroleum refining industry as fluid clay cracking catalyst. The Davison Chemical Company, of Baltimore 3, Maryand, produces such material commercially; their type F2 catalyst includes approximately 4 percent by weight of particles less than 20 microns in average diameter, approximately 8 percent by weight of particles of average diameter greater than 74 microns, and approximately 88 percent by weight of particles having diameters averaging between 20 and 80 microns. For ink to be used in developing charge patterns of approximately uniform density, a range of sizes between twenty and eighty microns has been found desirable. The clay catalyst particles greatly in excess of eighty microns may be removed by standard screening procedures, and those considerably under twenty microns in diameter may be removed by air elutriation, which is also a standard technique widely employed in the processing of finely divided materials such as ceramic raw materials, and Portland cement. The coloring materials I employ are standard water-suspendible organic dyes, such as the Carmoisine, Acid Green, and Alizarine Light Blue sold commercially by Sandoz, Incorporated, of New York, N.Y. In order to insure uniform deposition of the dyes upon the clay surface, I find it expedient to add to the water in which the dye is suspended a relatively viscous material such as glycerine; and to achieve a modicum of electrical conductivity, I add a small amount of preferably hygroscopic salt, such as lithium chloride, to the water. Since weak acids or bases would not add much to conductivity and strong ones are corrosive, salts are preferable. Any conductivity producing water-soluble material may be used.

The lithium chloride may be dissolved in the water, the glycerine may then be stirred into the solution, and the dye may be added, in that sequence. The water-glycerine-lithium chloride-dye solution is then brought approximately to the boiling point—to a temperature of about two hundred degrees Fahrenheit, for example—and the clay catalyst particles are then added to the hot solution and stirred into the liquid until the mixture behaves like a somewhat viscous paste, such as toothpaste. I have found the following proportions satisfactory for this purpose, although it is obvious that variations are possible:

Water _____ milliliters__ 900
Glycerine _____ do____ 50
Lithium chloride _____ grams__ 11
Dye _____ do____ 10
Clay catalyst to make thin paste (approx. 1000 grams)

The glycerine may be replaced with diethylene glycol, and the lithium chloride may be replaced with zinc chloride or calcium chloride. Other polyhydric alcohols or other polar water-soluble compounds of suitable fluidity and boiling point may replace glycerine.

The mixture is spread out on a suitable surface and dried in an air-drying oven. The resulting product is a fluid collection of solid particles, colored by the dye, and sufficiently conductive to be used to develop electric charge patterns on dielectric media having conductive backing layers, according to the teaching of copending application for United States Patent Serial Number 714,767, filed February 12, 1958, by Robert E. Benn and Herman Epstein, entitled "Electrographic Recording Process," which is assigned to the assignee of this application. It is explained in detail in the Benn-Epstein application how a great benefit may be achieved by providing a conductive backing layer on a dielectric record medium, so that the effective surface capacitance of the dielectric medium will be increased; and how the use of an unchanged conductive ink for developing a charge pattern on such a record medium permits the flow of bound charges from the back conductive layer into the conductive ink directly opposed to the stored charge pattern.

The arbitrary method employed for measuring the bulk resistance of electrographic inks, as described by Seymour in his aforesaid copending application for patent, consists in placing in an insulating circular cylinder one inch in diameter with a metal terminal plug in the bottom sufficient ink to fill the cylinder to a depth of one inch when a total force of one hundred grams is applied to the top of the mass of ink. With this total force of one hundred grams compressing the ink, the electrical resistance between metal plug contacts at the bottom and the top of the ink mass is measured. This method is purely arbitrary and has no physical significance other than empirical. Seymour reported that values from 1,000 to 10,000 ohms were satisfactory. I find that ink made according to my present invention functions satisfactorily even when measurements made as described indicate it to have a bulk resistance of approximately a megohm. However, the currents flowing in the electrostatic developing process are so extremely minute by comparison with the currents passed through a bulk of ink during measurement of the electrical resistance of such a bulk that it is possible that the correlation between measured bulk resistance and effective resistance during actual development is very poor, and that the resistivities actually manifested in use by the carbon-coated ink of Seymour and the dyed ink of my own invention are much more nearly alike than bulk measurements indicate.

Since ink made according to my invention may be produced in any color for which a suitable dye is available, it becomes possible to consider means for printing electrostatically in different colors. It is true that the United States Patent to Selenyi 2,143,214, entitled "Production of Images," teaches the possibility of producing simultaneous deposits of minium and sulphur on charge patterns comprising two different polarities of charge; but this is a somewhat fortuitous result of the electrical properties of two materials which happen to have different colors, and does not open the way to printing in two arbitrarily chosen colors and in using the same material for the cores of the particles. It is, of course, possible to print electrostatically in any number of different colors by applying first the pattern to be printed in a given color, developing that with ink of the desired color and fixing the ink, and then applying, developing and fixing a pattern developed in ink of a second color, and so on. However, the advantages of printing in two or more different colors, such as black and red, are sufficient to justify slight additional complexity in the present standard single-color electrostatic printing process to achieve at least two-color printing.

I have found that it is possible to prepare ink in different particle sizes and characteristics, and to achieve selective attachment of these different particles to regions of different charge density to obtain thereby regions of differing characteristics. For example, ink having a particle size ranging from forty to fifty microns, and ink having a particle size ranging from one hundred to one hundred ten microns, will behave differently, when applied to patterns of electrostatic charges of differing densities. It is possible to apply charges differing in density either by altering the voltage employed to deposit the charges on the record medium, or by employing a fixed voltage and limiting the quantity of charge available for deposition in a given time. The latter procedure is preferable, since the maximum possible density obtainable (which necessarily determines the minimum spot size producible for a given magnitude of charge) is limited by the voltage used to store the charge; and generally the smallest possible spot size is desirable.

The total charge on a sphere tends, other things being equal (which practically never occurs), to be proportional to the surface area of the sphere, and the mass of the sphere for a given density is proportional to the cube of its radius, or the 3/2 power of its area. Thus the larger the diameter of the sphere, the stronger the field required to attach it to the surface of the record medium, in general. Thus the larger diameter ink particles will be retained only by the higher density charges, while the smaller diameter ink particles will be retained by both the high and the low density charges.

Figure 3:
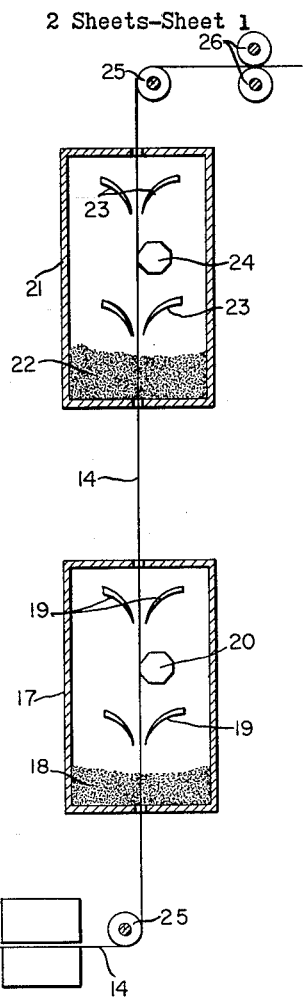
FIGURE 3 represents the dielectric medium of FIGURE 2 undergoing selective development by a process and apparatus according to my invention.

FIGURE 3 represents a device for producing two-color electrostatic printing by the methods here outlined. Recording medium 14, having a highly insulating dielectric surface with an electrically conductive backing is fed from a storage reel 16 through a printing station 15, represented in more detail in FIGURES 6 and 7, and around an idler 25 into a first developing station comprising a container 17 partly filled with a mass of ink 18. The ink 18 is of large particle size, e.g. from ninety to one hundred twenty microns average diameter, and of a first color coating. The heavily charged areas of medium 14 will be covered with adherent particles of ink 18 during passage of medium 14 through the ink 18. Upon rising clear of the mass of ink 18, the medium passes between baffles 19 which prevent any accidental purely mechanical adhesions of ink from passing up with the medium 14, and medium 14 is also engaged and shaken by a polygonal rotating beater 20, driven by means not here shown, which shakes loose any particles or aggregations of ink 18 accidentally adhering to any part of medium 14 where there is not in fact a charge of high density. The point of entrance of the medium 14 through the bottom of vessel 17 may be kept tight by the use of wipers of felt or similar material which will permit the passage of the medium upward without allowing the downward flow of the ink 18. Similarly, the point of entrance of medium 14 through the bottom of vessel 21 may be kept tight by the use of wipers, but these must not fit so tightly that they will wipe off the particles of ink 18.

The medium 14, having been developed in a first color by ink 18, then enters a vessel 21, containing a quantity of ink 22, ranging in average particle diameter from twenty to sixty microns, and dyed a second color. The ink 22 adheres to the charged area of the dielectric surface of medium 14 not yet covered with ink 18; that is, primarily to the areas of low-density charges. After passing between baffles 23 similar in design and purpose to baffles 19, and against a beater 24 similar in design and purpose to beater 20, the medium passes around an idler 25 and between fixing pressure rolls 26 which compress the particles of ink against the surface of medium 14 so as to embed the ink in the medium and thus fix it.

FIGURE 4 represents an arrangement very similar to that of FIGURE 3, except that the single developing chamber contains an ink 27, composed of a mixture of inks 18 and 22. I have found that, when a mixture of large and small particle sizes is used in developing ink, while the small particle sizes alone cling to the areas of low charge density, the high-density areas attract both large and small sized particles. However, the larger particles tend to conceal the smaller ones, so that the predominant color impression produced is that the areas of high charge density are covered with ink of one color and the areas of low charge density are covered with ink of the other color. Thus passage of the medium 14, bearing a record in two different charge densities applied by recording station 15, through the ink mixture 27 results in the application of inks 18 and 22 selectively to the regions of differing charge density, thus producing a two-color development of the electrostatic charge pattern on the medium. The baffles 19 and beater 20 serve the same function as in FIGURE 3; and, after passage over an idler 25 the medium will undergo fixing of its two-color developed pattern by the pressure of the opposed rolls 26.

Figure 2:
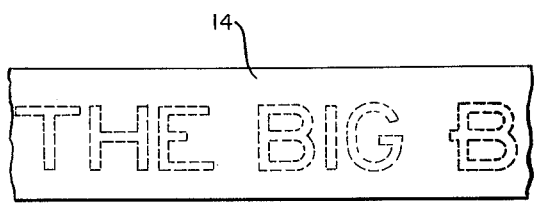
FIGURE 2 represents a dielectric medium bearing a charge pattern of varying densities, invisible because undeveloped.
Figure 5:
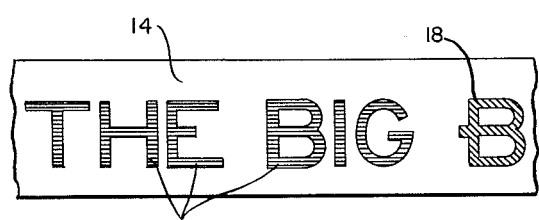
FIGURE 5 represents the dielectric medium of FIGURE 2 after development according to the process of FIGURE 3 or of FIGURE 4, showing a reproduction in two colors of the charge patterns represented in FIGURE 2.

FIGURE 5 represents, developed in two colors with inks 18 and 22, the same charge pattern on medium 14 represented undeveloped in FIGURE 2. This substantial result may be obtained either by the method of FIGURE 3 or by that represented by FIGURE 4.

It is, of course, possible to employ the basic principle of charge-density alteration and differences in ink particle size to achieve selective deposition of two inks differing in properties other than color—for example, it is taught by Seymour in his aforesaid patent application that the selective surface wetting characteristics of inks may be used to produce, by electrostatic printing, masters for reproduction by lithographic means.

FIGURE 6 represents schematically an arrangement for producing charge deposits of different densities. FIGURE 7 represents a detailed view of the printing head 39 represented as employed in FIGURE 6. This type of printing head is discussed in detail in application for United States Patent Serial Number 734,253, filed May 9, 1958, by Robert E. Benn, Richard S. Howell and Richard S. Sakurai, entitled "Electrographic Recording Apparatus," and assigned to the assignee of the present invention. Print head 39 has a body 40 of insulating material, which carries at least partially embedded therein an extended print electrode 41 and a plural number of associated initiating pin electrodes 42 extending alongside of the print electrode. It is understood that the print head may contain more than one print electrode and associated initiating electrodes. The basic mode of operation of the head employs a low-impedance voltage pulse source, known as a print pulse generator, connected to print electrode 41. High-impedance voltage pulse sources, or current pulse sources, are connected individually to initiating electrodes 42. A grounded electrode, such as anvil 38 of FIGURE 6, is opposed to the electrodes of head 39, and the path of movement of the dielectric record medium 14 is between the head and the anvil.

The amplitude of the print voltage pulse applied between print electrode 41 and anvil 38 is insufficient to cause an electrical discharge to occur in the ambient atmosphere around the electrodes. However, it is of sufficient magnitude so that if electric charges are provided in the ambient atmosphere, those of appropriate polarity will be driven toward the anvil 38, but will be stopped by deposition on medium 14. Initiating electrodes 42, five being shown, are employed to provide electric charges at selected points along print electrode 41. The high-impedance initiating pulse voltage sources connected to electrodes 42 produce pulses of polarity opposite to the printing voltage pulse applied to print electrode 41; and the initiating pulse sources have sufficiently high impedance so that they behave at least approximately like current sources. Thus an initiating pulse applied to a given pin electrode 42 will cause a breakdown of the ambient atmosphere between print electrode 41 and the initiating electrode 42, with a discharge at a given current, but without particularly affecting the potential of print electrode 41, which is fed from a low-impedance source. The simultaneous application of a print voltage pulse to the print electrode 41 and of an initiating current pulse to an initiating electrode 42 will cause deposition of an electrostatic charge on the dielectric surface of medium 14 approximately opposite the space between the two electrodes 41 and 42. The density of such a charge may be modified by one (or both) of two means. If the amplitude of the printing voltage pulse is reduced by a considerable factor (e.g. reduction from 1200 volts to 400 volts has been found satisfactory), the density of deposited charge will vary sufficiently to produce selective adherence of inks of 40 to 50 microns average diameter, and of inks of 100 to 110 microns average diameter. Alternatively, the total charge available from each initiating discharge may be varied by altering the current in or duration of each initiating pulse, keeping the printing voltage pulse amplitude constant. This latter procedure has the advantage that the definition of the deposited charge spot is less unfavorably affected by variations in available charge than by variations in printing voltage. Combination of both methods is, of course, also possible.

FIGURE 6 represents means for practicing either of these methods, or both. A reel 37 carries a supply of dielectric tape medium 14 which is fed by means not shown between grounded anvil 38 and electrostatic printing head 39, detailed in FIGURE 7 as above described. Printing electrode 41 is connected by conductor 33 to print pulse generator 32, which is grounded and is connected by conductor 31 to decoder and control signal generator 30. Initiating electrodes 42 are individually connected by conductors 36 to separate selector and initiating pulse generators 35, which are grounded and are also connected by conductors 34 to decoder and control signal generator 30. The use of simple rectangles to represent electrical elements is made because the state of the electrical art is such that, given the inventive concept calling for particular voltages of pulses produced at particular times through specified impedances, the implementation of the inventive concept may be achieved in a number of ways according to well known art. The application for United States patent to Benn, Howell and Sakurai to which reference was previously made herein gives complete information for the construction of print and selecting pulse generators and the associated equipment for their use. However, reference to various volumes of the Radiation Laboratory Series, particularly volume 5, "Pulse Generators," by Glasoe and Lebacqz, dated 1949, and volume 19, "Waveforms," by Chance, Hughes, MacNichol, Sayre and Williams, dated 1949, all published by the McGraw-Hill Book Company, Incorporated, of New York City, New York, is made here to establish the vast extent of the known art.

In the first contemplated mode of operation of the device represented in FIGURE 6, data source 28 transmits via channel 29 (which may be a single conductor as here implied, or any one of many equivalents) the data to be printed, which are received by decoder and control signal generator 30. The decoder and control signal generator 30 is specified as containing timing means for determining the appropriate time for transmission of the various control signals of which it is capable. It is also required to be capable of performing the function of decoding incoming signals from data source 28 to determine which characters should be printed in response to these signals, and of exciting via lines 34 the appropriate ones of initiating pulse generators 35 to cause via lines 36 discharges at the proper ones of initiating electrodes 42 to produce charge deposition at the appropriate place and and at the correct time to produce charge patterns as required for a given symbol. During the time of the initiating discharges the control signal generator also must excite the print pulse generator 32 by channel 31 and cause it to apply via channel 33 a printing pulse to print electrode 41.

The sequence of operation outlined thus far would result in conventional electrostatic printing, at approximately uniform charge density. However, let the specification of the print pulse generator be amended to require that it be capable of applying, upon appropriate signal, either of two different pulse voltages to the print electrode 41, and that the control signal generator 30 be capable of providing such selective signals via channel 31. Then when a high-density pattern is to be printed, the print pulse generator 32 will be controlled to produce a high-voltage printing pulse; and when a low-density pattern is to be printed, the control signal generator 30 will control the print pulse generator 32 to cause it to produce a lower voltage printing pulse of, e.g. one-half the higher value. As an alternative, let the specifications of the initiating pulse generators 35 be amended to provide that they be capable of providing pulses of two different values of current. Since the approximation to constant current pulses is achieved by causing the initiating pulse generators to produce a pulse of given voltage amplitude through a high impedance, the same design feature which can permit a print pulse generator to produce pulses of either of two voltage amplitudes can permit an initiating pulse generator to produce pulses of either of two current amplitudes. One rather primitive but straightforward way of producing on a given terminal pulses of two amplitudes is to employ two separate pulsing circuits each adapted to give out a particular voltage, and to tie the two circuits to the given terminal through series output diodes, commonly known in such use as "or" gates or buffers. (This is a part of standard electronic design and involves only known art.) Furthermore, let the specification of the decoder and control signal generator 30 be amended to provide that it be capable of designating in its function of controlling the initiating pulse generators 35 not only which generators shall fire, but whether they shall produce high or low current pulses. Then, with the print voltage pulse at a fixed amplitude, a low-current initiating discharge will make available for deposition only a limited quantity of charge, producing a low-density charge pattern adapted to cause the adherence of only small-diameter ink particles; and a high-current initiating pulse will make available a larger quantity of charge and produce a high-density charge pattern adapted to cause the adherence of ink particles of larger diameters.

A third alternative for depositing charge patterns of differing densities is to cause the printing voltage pulse and the initiating current pulse to be decreased simultaneously in order to produce low-density charge deposition. However, the ideal definition will be most nearly approached by the use of the highest feasible printing potential and control of charge density by limitation of available charge, according to well known physical principles.

It is thus evident that a wide variety of colors of particulate ink, of different average diameters of particles, may be produced at will for use as developers of electrostatic charge patterns; and that, by the use of electric patterns of different charge densities, it is possible to selectively develop such patterns with two or more different kinds of ink.

Obviously, many modifications and variations of the present invention are possible in the light of the above teachings. It is, therefore, to be understood that within the scope of the appended claims the invention may be practiced other than as specifically described and illustrated.

What is claimed is:

1. The method of recording in two different inks comprising the steps of establishing on a charge-retentive medium a pattern of electric charges of at least two different charge densities of the same polarity, subjecting the said medium bearing said pattern to the developing action of a first particulate uncharged conductive ink having a preponderance of its particles of such large size as to adhere principally to the portions of the said pattern having the greater of the said two different charge densities, said first ink size being of the order of ninety to one hundred and twenty microns average diameter, subjecting the said medium to a fixing operation adapted to fix the particles of said first ink in their positions of adherence to said medium, subjecting the said medium bearing said pattern and said fixed particles of said first ink to the developing action of a second particulate uncharged conductive ink having a preponderance of its particles of sufficiently small size as to be adapted to adhere to the portions of the said pattern having the lesser of the said two different charge densities, said second ink size being of the order of twenty to sixty microns average diameter, and subjecting the said medium to a fixing operation adapted to fix the particles of the said second ink in their positions of adherence to the said medium.

2. A method of recording by two different inks comprising the steps of: establishing on a charge-retentive medium a pattern of electric charges in two different charge densities of the same polarity, corresponding to the areas to be recorded by the said two different inks; developing the said charge pattern by exposing to its attractive forces a first uncharged conductive ink consisting of particles of such size as to be adherently attracted by the greater of the two said different charge densities and a second uncharged conductive ink consisting of particles of such size as to be adherently attracted by either of the said two different charge densities, said first ink size being of the order of ninety to one hundred twenty microns average diameter, said second ink size being of the order of twenty to sixty microns average diameter.

3. The method claimed in claim 2 characterized by the fact that the said two different inks are mixed together before being subjected to the said attractive forces of the said charge pattern.

4. The method of electrostatic recording in two different colors comprising establishing on a charge-retentive medium patterns of electric charges of two different densities of the same polarity, and developing the said patterns with particulate uncharged conductive inks of two colors, one said ink consisting of particles too large to be attracted adherently to the patterns of lesser charge density, but capable of being attracted adherently to the patterns of greater charge density, and the other said ink comprising particles sufficiently small to be attracted adherently to the patterns of lesser charge density, said first large particles being of the order of ninety to one hundred twenty microns average diameter, said second small particles being of the order of twenty to sixty microns average diameter.

5. A method of electrostatic recording comprising:
   recording patterns of two distinguishably different electric charge densities of the same polarity,
   developing the said patterns selectively by distinguishably different uncharged conductive inks,
   one of said inks comprising particles of mass corresponding to sizes of the order of ninety to one hundred twenty microns average diameter,
   the other of said inks comprising particles of mass corresponding to sizes of the order of twenty to sixty microns average diameter,
   one of said charge densities being sufficient to attract substantially only particles of said other ink.

6. An improved method of electrical printing comprising:
   establishing on a charge-retentive record medium patterns of electrical charges of at least two different charge densities of the same polarity,
   exposing the said patterns of electrical charges in a first chamber to a first particulate uncharged conductive ink of particle sizes of the order of ninety to one hundred twenty microns average diameter,
   one of said charge density patterns being established such that said first ink particles adhere to it,
   exposing the said patterns of electrical charges in a second chamber to a second uncharged conductive particulate ink of particle sizes of the order of twenty to sixty microns average diameter,
   another of said charge density patterns being established such that said second ink particles are responsive to adhere to it and said first ink particles are too large to responsively adhere to it.

7. A method of electrical printing comprising:
   establishing patterns of charges of different densities of the same polarity on a charge-retentive recording medium, advancing said charge-retentive recording medium through a first mass of uncharged conductive particulate ink, the particles of which range in the order of ninety to one hundred twenty microns average diameter, then advancing said charge-retentive record medium through a second mass of uncharged conductive particulate ink, the particles of which range in the order of twenty to sixty microns average diameter, one of said charge densities being established on said medium sufficiently strong to effect adherence of said first and said second mass particles, another of said charge densities being only strong enough to effect adherence of said second mass particles.

8. A method as claimed in claim 7, including the steps of agitating said record medium on emmergence from each of said first and said second masses of ink.

9. In electrical printing, the method comprising: establishing on a charge-retentive record medium patterns of electric charges at two different charge densities of the same polarity, rendering visible said charged patterns of the record medium comprising advancing said record medium through an inking material formed of uncharged conductive cores of like material but of different particle sizes, said cores having a larger size range from ninety to one hundred twenty microns average diameter and a smaller size range from twenty to sixty microns average diameter, the larger size cores being attracted adherently to the charge patterns of heavier density on the record medium and the smaller size cores being attracted adherently to the charge patterns of lighter density on the record medium, each core size having a coating contrasting in color to that of the other, and subjecting the record medium to said inking material effecting inking of a different color of each of the patterns of different charged density.

References Cited in the file of this patent

UNITED STATES PATENTS

| | | |
|---|---|---|
| 2,143,214 | Selenyi | Jan. 10, 1939 |
| 2,684,902 | Mayo et al. | July 27, 1954 |
| 2,705,199 | Clark | Mar. 29, 1955 |
| 2,753,308 | Landrigan | July 3, 1956 |
| 2,761,416 | Carlson | Sept. 4, 1956 |
| 2,851,373 | Tregay et al. | Sept. 9, 1958 |
| 2,879,397 | Lehmann | Mar. 24, 1959 |
| 2,892,794 | Insalaco | June 30, 1959 |
| 2,912,586 | Gundlach | Nov. 10, 1959 |
| 2,914,403 | Sugarman | Nov. 24, 1959 |
| 2,919,672 | Benn et al. | Jan. 5, 1960 |

OTHER REFERENCES

Journal of Optical Society of America, vol. 38, No. 12, December 1948, pp. 991 to 996.